United States Patent
Keefe et al.

(10) Patent No.: US 9,017,795 B2
(45) Date of Patent: Apr. 28, 2015

(54) ACTIVELY CONTROLLED TEXTURING SYSTEMS

(75) Inventors: Andrew C. Keefe, Encino, CA (US); Christopher P. Henry, Thousand Oaks, CA (US); Geoffrey P. McKnight, Los Angeles, CA (US); Guillermo A. Herrera, Winnetka, CA (US); Alan L. Browne, Grosse Pointe, MI (US); Nancy L. Johnson, Northville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 559 days.

(21) Appl. No.: 13/232,488

(22) Filed: Sep. 14, 2011

(65) Prior Publication Data

US 2012/0015149 A1 Jan. 19, 2012

Related U.S. Application Data

(63) Continuation-in-part of application No. 12/761,709, filed on Apr. 16, 2010, now abandoned.

(51) Int. Cl.
*B32B 3/28* (2006.01)
*B29C 59/02* (2006.01)
*B29C 59/18* (2006.01)
*B44C 1/00* (2006.01)

(52) U.S. Cl.
CPC .......... *B29C 59/02* (2013.01); *Y10T 428/24446* (2015.01); *Y10T 156/1039* (2015.01); *Y10T 428/24942* (2015.01); *B29C 59/18* (2013.01); *B44C 1/005* (2013.01)

(58) Field of Classification Search
CPC .......... B29C 59/02; B29C 59/18; B44C 1/005
USPC ....................................................... 428/152
See application file for complete search history.

(56) References Cited

U.S. PATENT DOCUMENTS

2010/0116430 A1* 5/2010 Yang et al. .................. 156/275.7
2010/0234947 A1* 9/2010 Ben Rubi et al. .......... 623/11.11

* cited by examiner

*Primary Examiner* — William P Watkins, III

(57) ABSTRACT

Actively controlled texturing systems for and methods of selectively and reversibly forming wrinkles, or modifying the amplitude, wavelength, or pattern of existing wrinkles upon a surface using active material actuation.

16 Claims, 3 Drawing Sheets

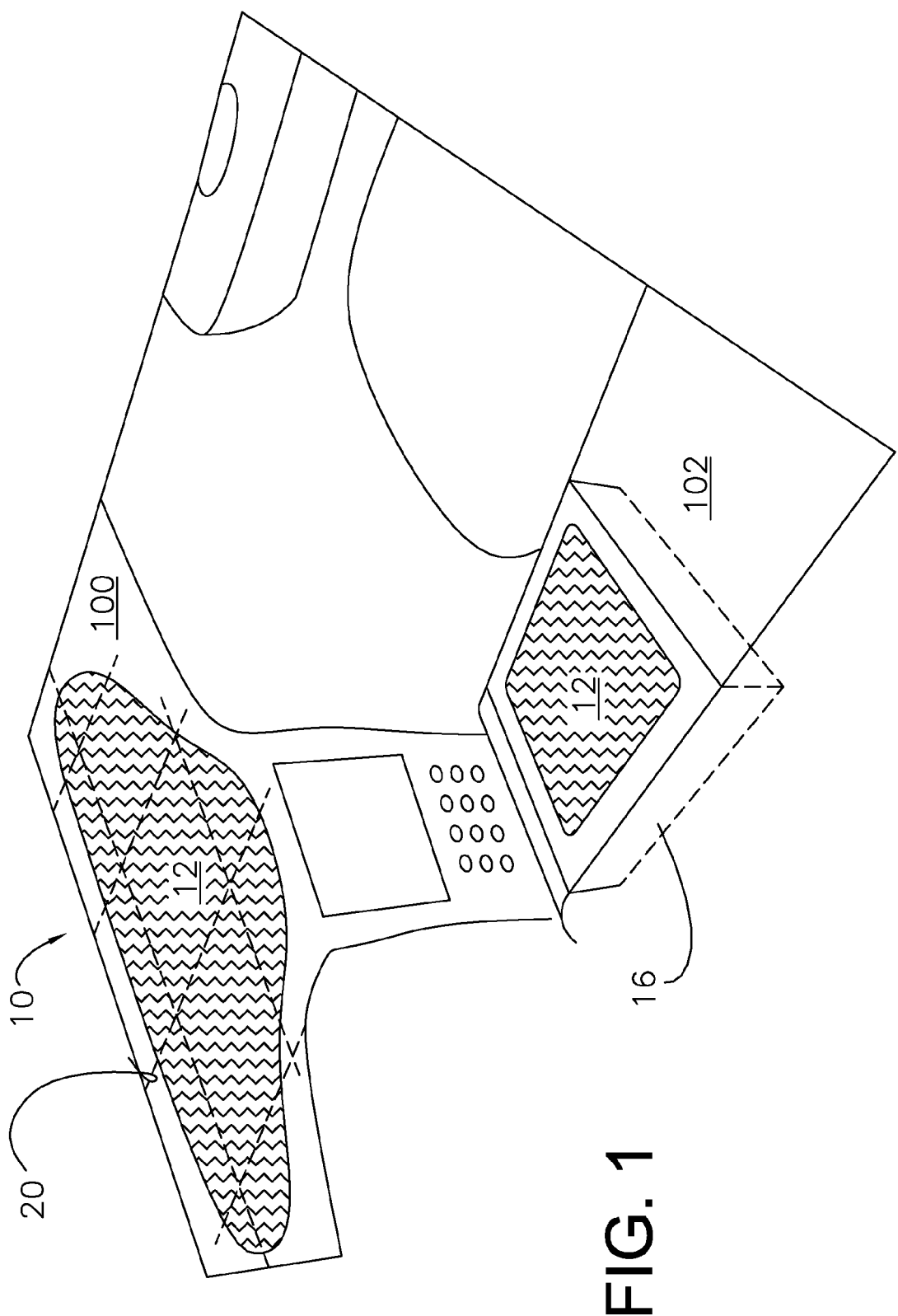

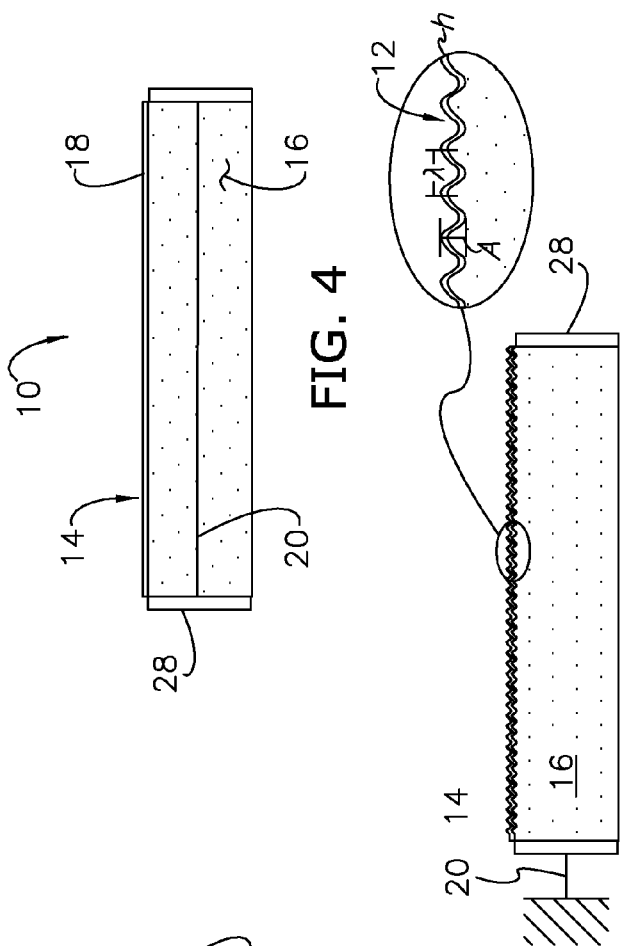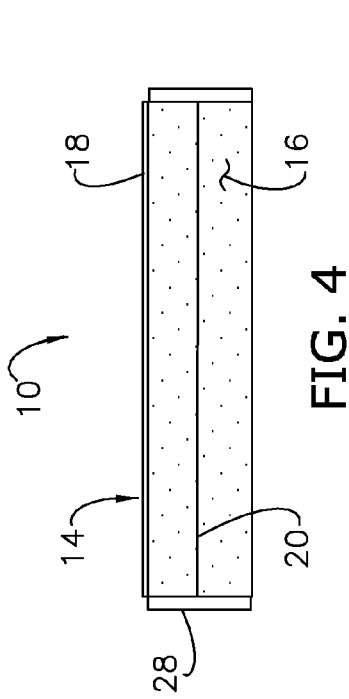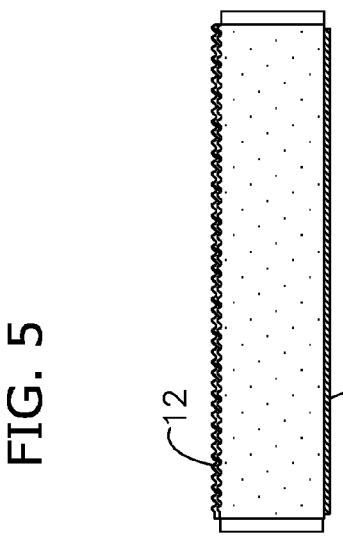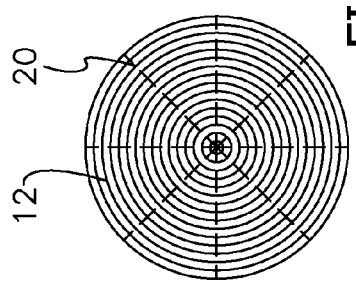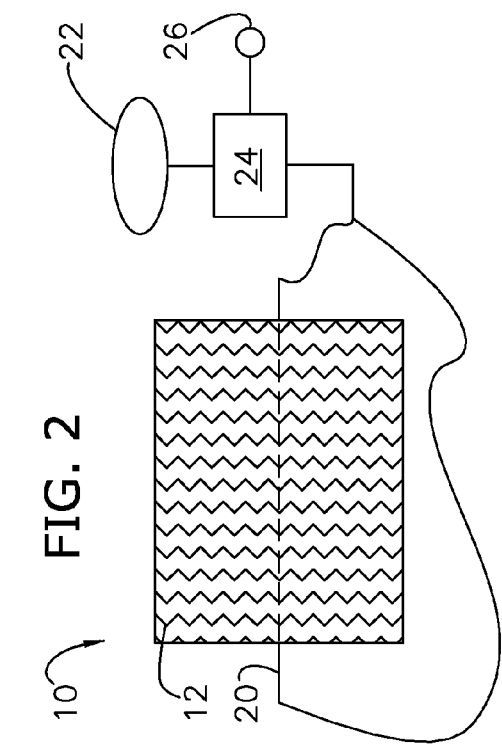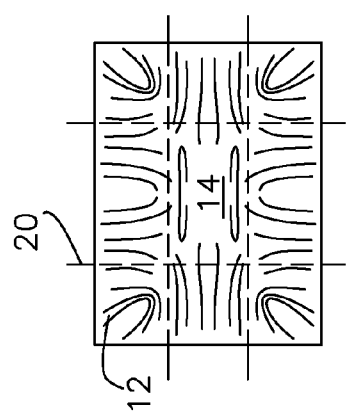

ACTIVELY CONTROLLED TEXTURING SYSTEMS

CROSS REFERENCE TO RELATED APPLICATIONS

The present application claims priority to and continues in part from U.S. application Ser. No. 12/761,709 entitled "ASSEMBLY FOR AND METHOD OF FORMING LOCALIZED SURFACE WRINKLES" and filed on Apr. 16, 2010, the entire scope of which is hereby incorporated by reference.

BACKGROUND OF THE INVENTION

1. Field of the Invention

The present disclosure generally relates to systems for and methods of producing surface wrinkles. More particularly, the invention pertains to a system for and method of actively producing surface wrinkles using active material actuation, and more applicably, shape memory alloy and shape memory polymer activation.

2. Discussion of Prior Art

Surface wrinkles have been used to effect, modify, or control various benefits/conditions, including surface adhesion, reflection, texturing, coefficients of friction, structural colors, metrology, and haptic alerts. Methods of producing surface wrinkles preexisting in the art include using a stretched substrate overlaid by a rigid (e.g., metal) overlay. Wrinkles are instantaneously or selectively produced in the overlay, upon the release of energy by the substrate, if the compressive strain in the overlay exceeds the critical bucking strain. As a result, these conventional methods produce generalized wrinkles that co-extend with the entire surface defined by the overlay. This method is in fact behind wrinkles commonly encountered, for example, on human skin and dehydrated apples. Of particular interest is that the wrinkle geometry is closely related to the material properties. Precisely controlled wrinkle structures have found many interesting applications including nano-metrology, stretchable electronics, biosensors, and manipulation of material topographic properties.

BRIEF SUMMARY OF THE INVENTION

The present invention recites a novel system for and method of actively producing wrinkles within a surface, and more specifically, to a system for and method of producing surface wrinkles utilizing active material actuation. The present invention is useful for modifying the surface texture, and/or coefficient of friction of a continuous surface, so as to modify a physical interaction with the surface. The physical interaction may be reflective, thermal, fluidic, electro-magnetic, tactile, acoustic, emissive, or simply visual or aesthetic.

The benefits of active surface textures can be realized across many applications, and may interact with different physical phenomena over a broad range of texture changes. The wavelength modification may be on the order of microns in one application and centimeters for another (diffraction and friction, respectively) or larger (aesthetics). In a specific example, the present invention may be used to modify the roughness of a vehicular surface, such as the dashboard, so as to diffuse veiling glare caused by the sun or oncoming traffic, and thereby reduce driver eye fatigue. This will allow lighter colored materials to be utilized (giving the interior cabin a more spacious appearance), without detriment to visibility. In other automotive applications, the present invention is useful for modifying skid resistance, slip resistance, and the overall slipperiness of surfaces such as of running boards, floors of cargo areas, seats, horizontal surfaces in general and walls of storage areas such as cup holders, reducing (or increasing) RADAR scatter on electrically conductive surfaces, mitigating acoustic noise, such as wind noise, modifying airflow over surfaces and thus aerodynamic drag, and increasing (or reducing) emissivity and convective/conductive heat transfer rates of a surface, such as a steering wheel surface.

In general, the invention presents a system for selectively forming wrinkles, or modifying the amplitude, wavelength, and/or pattern of existing wrinkles upon a surface. The system includes a reconfigurable substrate presenting a first elastic modulus and Poisson's ratio, and an overlay that defines the surface, is adhered to the substrate, and presents a second elastic modulus or Poisson's ratio greater than the first. The system further includes at least one active material element operable to undergo a reversible change in fundamental property when exposed to or occluded from an activation signal. The element(s) is communicatively coupled to the overlay, and is configured such that the change causes the substrate to reconfigure and the wrinkles to form or modify upon the surface as a result thereof.

The disclosure may be understood more readily by reference to the following detailed description of the various features of the disclosure and the examples included therein.

BRIEF DESCRIPTION OF THE SEVERAL VIEWS OF THE DRAWING

A preferred embodiment(s) of the invention is described in detail below with reference to the attached drawing figures of exemplary scale, wherein:

FIG. 1 is a perspective view of the interior cabin of a vehicle, particularly illustrating a controlled texturing system including wrinkled overlays composing the dashboard, and center console, and a shape memory wire mesh, in accordance with a preferred embodiment of the invention;

FIG. 2 is a plan view of an actively controlled texturing system including an overlay defining axially produced surface wrinkles, and further including a shape memory wire actuator, a sensor, a power supply, and a controller communicatively coupled to the actuator, sensor, and supply, in accordance with a preferred embodiment of the invention;

FIG. 3 is a plan view of an overlay surface defining bi-axially produced surface wrinkles, and plurality of shape memory wires, wherein the wires present a mesh configuration, in accordance with a preferred embodiment of the invention;

FIG. 4 is a cross-section of an actively controlled texturing system including an overlay defining a flat pre-activation surface, a substrate adhered to the overlay, a shape memory wire actuator embedded within the substrate fixedly secured to end caps oppositely engaging the substrate, in accordance with a preferred embodiment of the invention;

FIG. 4a is a partial plan view of an actively controlled texturing system having radially extending wires and defining a radial wrinkle pattern, in accordance with a preferred embodiment of the invention;

FIG. 5 is a cross-section of an actively controlled texturing system including an overlay defining surface wrinkles (in enlarged caption view), a substrate adhered to the overlay, a shape memory wire actuator external to the substrate, and end caps oppositely engaging the substrate, in accordance with a preferred embodiment of the invention;

FIG. 6 is a cross-section of an actively controlled texturing system including an overlay defining surface wrinkles, a substrate adhered to the overlay, and an active material sheet disposed beneath the substrate, in accordance with a preferred embodiment of the invention;

DETAILED DESCRIPTION OF THE INVENTION

Figure 7:
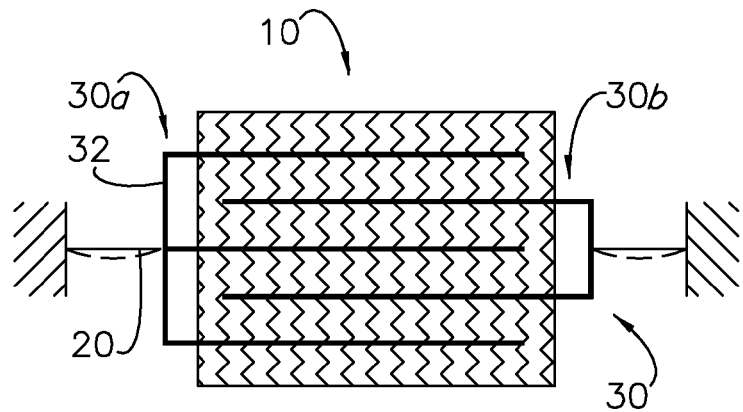
FIG. 7 is a partial plan view of an actively controlled texturing system including a substrate, overlapping rigid members embedded therein, and shape memory arcuate actuators drivenly coupled to the members, in accordance with a preferred embodiment of the invention.

The following description of the preferred embodiments is merely exemplary in nature and is in no way intended to limit the invention, its application, or uses. As described and illustrated herein, a novel system 10 for and method of selectively and reversibly forming wrinkles (i.e., wrinkle structures) 12 upon the entirety of a surface 14 is presented herein (FIGS. 1-9). The inventive system 10 may be used to effect an intended interaction characteristic or phenomenon over a wide range of applications, including but not limited to haptic alert systems, and processes dependant upon static and/or kinematic friction. In FIG. 1, the system 10 is shown in an automotive setting, wherein the texture of the dashboard 100 has been modified, for example, to reduce veiling glare and driver eye fatigue; and the texture of the center console 102 has been modified to reduce the contact surface area of engagement with a hot surface.

The system 10 generally includes a reconfigurable (e.g., elastic, compressible, shape recoverable, etc.) substrate 16 and a thin, high modulus overlay 18, wherein the substrate 16 and overlay 18 present a predetermined moduli and/or Poisson's ratio relationship. The system 10 preferably further includes an active material actuator 20 that is drivenly coupled to and operable to reconfigure the substrate 16; though it is appreciated that conventional actuators, such as solenoids and motors may be utilized. Through activation of the active material (or conventional) actuator 20 the substrate 16 is reconfigured, such that a change in lateral dimension is achieved; and by changing the lateral dimensions of the substrate 16 the overlay 18 is caused to buckle, thereby producing the targeted wrinkling effect. The wrinkling pattern may then be reversed, making a preferred material system 10 one that is sufficiently elastic to remain reversible over the desired number of cycles. Exemplary embodiments of the present invention are more particularly described below.

I. Description of Exemplary Active Materials

As used herein the term "active material" is defined as any of those materials or composites that exhibit a reversible change in fundamental (i.e., chemical or intrinsic physical) property when subjected to an activation signal. In the present invention, active materials may be used to effect reconfiguration of the substrate 16, and may compose an actuator 20, the substrate 16, and/or the overlay 18 itself.

Suitable active materials for use as an actuator include but are not limited to shape memory materials that have the ability to remember their original at least one attribute such as shape, which can subsequently be recalled by applying an external stimulus. Exemplary shape memory materials include shape memory alloys (SMA), shape memory polymer (SMP), shape memory ceramics, electroactive polymers (EAP), ferromagnetic SMA's, electrorheological (ER) compositions, magnetorheological (MR) compositions, dielectric elastomers, ionic polymer metal composites (IPMC), piezoelectric polymers, piezoelectric ceramics, various combinations of the foregoing materials, and the like. With respect to the substrate, and as previously presented, SMP is particularly suitable for use.

More particularly, shape memory alloys (SMA's) generally refer to a group of metallic materials that demonstrate the ability to return to some previously defined shape or size when subjected to an appropriate thermal stimulus. Shape memory alloys are capable of undergoing phase transitions in which their yield strength, stiffness, dimension and/or shape are altered as a function of temperature. Generally, in the low temperature, or Martensite phase, shape memory alloys can be plastically deformed and upon exposure to some higher temperature will transform to an Austenite phase, or parent phase, returning to their shape prior to the deformation.

Shape memory alloys exist in several different temperature-dependent phases. The most commonly utilized of these phases are the so-called Martensite and Austenite phases. In the following discussion, the Martensite phase generally refers to the more deformable, lower temperature phase whereas the Austenite phase generally refers to the more rigid, higher temperature phase. When the shape memory alloy is in the Martensite phase and is heated, it begins to change into the Austenite phase. The temperature at which this phenomenon starts is often referred to as Austenite start temperature ($A_s$). The temperature at which this phenomenon is complete is called the Austenite finish temperature ($A_f$).

When the shape memory alloy is in the Austenite phase and is cooled, it begins to change into the Martensite phase, and the temperature at which this phenomenon starts is referred to as the Martensite start temperature ($M_s$). The temperature at which Austenite finishes transforming to Martensite is called the Martensite finish temperature ($M_f$). Generally, the shape memory alloys are softer and more easily deformable in their Martensitic phase and are harder, stiffer, and/or more rigid in the Austenitic phase. In view of the foregoing, a suitable activation signal for use with shape memory alloys is a thermal activation signal having a magnitude to cause transformations between the Martensite and Austenite phases.

Shape memory alloys can exhibit a one-way shape memory effect, an intrinsic two-way effect, or an extrinsic two-way shape memory effect depending on the alloy composition and processing history. Annealed shape memory alloys typically only exhibit the one-way shape memory effect. Sufficient heating subsequent to low-temperature deformation of the shape memory material will induce the Martensite to Austenite type transition, and the material will recover the original, annealed shape. Hence, one-way shape memory effects are only observed upon heating. Active materials comprising shape memory alloy compositions that exhibit one-way memory effects do not automatically reform, and require an external mechanical force to return the shape to its previous configuration.

Intrinsic and extrinsic two-way shape memory materials are characterized by a shape transition both upon heating from the Martensite phase to the Austenite phase, as well as an additional shape transition upon cooling from the Austenite phase back to the Martensite phase. Active materials that exhibit an intrinsic shape memory effect are fabricated from a shape memory alloy composition that will cause the active materials to automatically reform themselves as a result of the above noted phase transformations. Intrinsic two-way shape memory behavior must be induced in the shape memory material through processing. Such procedures include extreme deformation of the material while in the Martensite phase, heating-cooling under constraint or load, or surface modification such as laser annealing, polishing, or shot-peening. Once the material has been trained to exhibit the two-way shape memory effect, the shape change between the low and high temperature states is generally reversible and persists through a high number of thermal cycles. In contrast, active materials that exhibit the extrinsic two-way shape memory effects are composite or multi-component materials that combine a shape memory alloy composition that exhibits a one-way effect with another element that provides a restoring force to reform the original shape.

The temperature at which the shape memory alloy remembers its high temperature form when heated can be adjusted by slight changes in the composition of the alloy and through heat treatment. In nickel-titanium shape memory alloys, for instance, it can be changed from above about 100° C. to below about −100° C. The shape recovery process occurs over a range of just a few degrees and the start or finish of the transformation can be controlled to within a degree or two depending on the desired application and alloy composition. The mechanical properties of the shape memory alloy vary greatly over the temperature range spanning their transformation, typically providing the system with shape memory effects, superelastic effects, and high damping capacity.

Suitable shape memory alloy materials include, without limitation, nickel-titanium based alloys, indium-titanium based alloys, nickel-aluminum based alloys, nickel-gallium based alloys, copper based alloys (e.g., copper-zinc alloys, copper-aluminum alloys, copper-gold, and copper-tin alloys), gold-cadmium based alloys, silver-cadmium based alloys, indium-cadmium based alloys, manganese-copper based alloys, iron-platinum based alloys, iron-platinum based alloys, iron-palladium based alloys, and the like. The alloys can be binary, ternary, or any higher order so long as the alloy composition exhibits a shape memory effect, e.g., change in shape orientation, damping capacity, and the like.

Thus, for the purposes of this invention, it is appreciated that SMA's exhibit a modulus increase of 2.5 times and a dimensional change of up to 8% (depending on the amount of pre-strain) when heated above their Martensite to Austenite phase transition temperature. It is appreciated that thermally induced SMA phase changes are one-way so that a biasing force return mechanism (such as a spring) would be required to return the SMA to its starting configuration once the applied field is removed. Joule heating can be used to make the entire system electronically controllable. Stress induced phase changes in SMA are, however, two-way by nature. Application of sufficient stress when an SMA is in its Austenitic phase will cause it to change to its lower modulus Martensitic phase in which it can exhibit up to 8% of "superelastic" deformation. Removal of the applied stress will cause the SMA to switch back to its Austenitic phase in so doing recovering its starting shape and higher modulus.

Ferromagnetic SMA's (FSMA's), which are a sub-class of SMAs, may also be used in the present invention. These materials behave like conventional SMA materials that have a stress or thermally induced phase transformation between Martensite and Austenite. Additionally FSMA's are ferromagnetic and have strong magnetocrystalline anisotropy, which permit an external magnetic field to influence the orientation/fraction of field aligned Martensitic variants. When the magnetic field is removed, the material may exhibit complete two-way, partial two-way or one-way shape memory. For partial or one-way shape memory, an external stimulus, temperature, magnetic field or stress may permit the material to return to its starting state. Perfect two-way shape memory may be used for proportional control with continuous power supplied. External magnetic fields are generally produced via soft-magnetic core electromagnets in automotive applications, though a pair of Helmholtz coils may also be used for fast response.

Barium titanates and bismuth titanates are common types of piezoelectric ceramics. Modified barium-titanate compositions combine high-voltage sensitivity with temperatures in the range of −10° C. to 60° C. Barium titanate piezoelectric ceramics are useful for hydrophones and other receiving devices. These piezoelectric ceramics are also used in low-power projectors. Bismuth titanates are used in high temperature applications, such as pressure sensors and accelerometers. Bismuth titanate belongs to the group of sillenite structure-based ceramics ($Bi_{12}MO_2O$ where M=Si, Ge, Ti).

Lead magnesium niobates, lead metaniobate, and lead nickel niobate materials are used in some piezoelectric ceramics. Lead magnesium niobate exhibits an electrostrictive or relaxor behavior where strain varies non-linearly. These piezoelectric ceramics are used in hydrophones, actuators, receivers, projectors, sonar transducers and in micropositioning devices because they exhibit properties not usually present in other types of piezoelectric ceramics. Lead magnesium niobate also has negligible aging, a wide range of operating temperatures and a low dielectric constant. Like lead magnesium niobate, lead nickel niobate may exhibit electrostrictive or relaxor behaviors where strain varies non-linearly.

Piezoelectric ceramics include PZN, PLZT, and PNZT. PZN ceramic materials are zinc-modified, lead niobate compositions that exhibit electrostrictive or relaxor behavior when non-linear strain occurs. The relaxor piezoelectric ceramic materials exhibit a high-dielectric constant over a range of temperatures during the transition from the ferroelectric phase to the paraelectric phase. PLZT piezoelectric ceramics were developed for moderate power applications, but can also be used in ultrasonic applications. PLZT materials are formed by adding lanthanum ions to a PZT composition. PNZT ceramic materials are formed by adding niobium ions to a PZT composition. PNZT ceramic materials are applied in high-sensitivity applications such as hydrophones, sounders and loudspeakers.

Piezoelectric ceramics include quartz, which is available in mined-mineral form and man-made fused quartz forms. Fused quartz is a high-purity, crystalline form of silica used in specialized applications such as semiconductor wafer boats, furnace tubes, bell jars or quartzware, silicon melt crucibles, high-performance materials, and high-temperature products. Piezoelectric ceramics such as single-crystal quartz are also available.

Suitable Magnetorheological elastomer materials include, but are not intended to be limited to, an elastic polymer matrix comprising a suspension of ferromagnetic or paramagnetic particles, wherein the particles are described above. Suitable polymer matrices include, but are not limited to, poly-alpha-olefins, natural rubber, silicone, polybutadiene, polyethylene, polyisoprene, and the like.

Electroactive polymers include those polymeric materials that exhibit piezoelectric, pyroelectric, or electrostrictive properties in response to electrical or mechanical fields. An example of an electrostrictive-grafted elastomer with a piezoelectric poly(vinylidene fluoride-trifluoro-ethylene) copolymer. This combination has the ability to produce a varied amount of ferroelectric-electrostrictive, molecular composite systems. These may be operated as a piezoelectric sensor or even an electrostrictive actuator.

Materials suitable for use as an electroactive polymer may include any substantially insulating polymer or rubber (or combination thereof) that deforms in response to an electrostatic force or whose deformation results in a change in electric field. Exemplary materials suitable for use as a pre-strained polymer include silicone elastomers, acrylic elastomers, polyurethanes, thermoplastic elastomers, copolymers comprising PVDF, pressure-sensitive adhesives, fluoroelastomers, polymers comprising silicone and acrylic moieties, and the like. Polymers comprising silicone and acrylic moieties may include copolymers comprising silicone and acrylic moieties, polymer blends comprising a silicone elastomer and an acrylic elastomer, for example.

Materials used as an electroactive polymer may be selected based on one or more material properties such as a high electrical breakdown strength, a low modulus of elasticity—(for large or small deformations), a high dielectric constant, and the like. In one embodiment, the polymer is selected such that is has an elastic modulus at most about 100 MPa. In another embodiment, the polymer is selected such that is has a maximum actuation pressure between about 0.05 MPa and about 10 MPa, and preferably between about 0.3 MPa and about 3 MPa. In another embodiment, the polymer is selected such that is has a dielectric constant between about 2 and about 20, and preferably between about 2.5 and about 12. The present disclosure is not intended to be limited to these ranges. Ideally, materials with a higher dielectric constant than the ranges given above would be desirable if the materials had both a high dielectric constant and a high dielectric strength. In many cases, electroactive polymers may be fabricated and implemented as thin films. Thickness suitable for these thin films may be below 50 micrometers.

As electroactive polymers may deflect at high strains, electrodes attached to the polymers should also deflect without compromising mechanical or electrical performance. Generally, electrodes suitable for use may be of any shape and material provided that they are able to supply a suitable voltage to, or receive a suitable voltage from, an electroactive polymer. The voltage may be either constant or varying over time. In one embodiment, the electrodes adhere to a surface of the polymer. Electrodes adhering to the polymer are preferably compliant and conform to the changing shape of the polymer. Correspondingly, the present disclosure may include compliant electrodes that conform to the shape of an electroactive polymer to which they are attached. The electrodes may be only applied to a portion of an electroactive polymer and define an active area according to their geometry. Various types of electrodes suitable for use with the present disclosure include structured electrodes comprising metal traces and charge distribution layers, textured electrodes comprising varying out of plane dimensions, conductive greases such as carbon greases or silver greases, colloidal suspensions, high aspect ratio conductive materials such as carbon fibrils and carbon nanotubes, and mixtures of ionically conductive materials.

II. Exemplary System Embodiments, and Applications

Shown in FIGS. 1-9 are exemplary embodiments of the actively controlled texturing system 10. In each of the embodiments, wrinkles 12 are reversibly produced within a stiff, thin overlay (e.g., film, layer, etc.) 18 adhered to a compliant, comparatively thick substrate 16 by selectively compressing the substrate 16 or recovering pre-strain previously applied thereto. That is to say, a high-modulus overlay 18 on a deformed low-modulus substrate 16 is caused to create wrinkles 12 of wavelength, $\lambda$, amplitude, A, and a general pattern (FIGS. 1-3) through deformation. It is appreciated that the wavelength ($\lambda$) and amplitude (A) is a function of the elastic moduli and Poisson's ratio of the materials.

More particularly, with respect to wrinkle formation, it is appreciated by those of ordinary skill in the art that where lateral compression strain exceeds a critical buckling value defined by the system 10, wrinkles 12 will form upon the surface 14. In a preferred embodiment, the critical buckling strain, $\in_c$, may be pre-determined according to the following formula:

$$\in_c = [9E_s^2/64E_f^2]^{1/3} \quad (1)$$

wherein $E_s$ is the modulus of the substrate 16, and $E_f$ is the modulus of the overlay 18; and accordingly the resultant wrinkle amplitude, A, may be determined by the following formula:

$$A = h[(\in/\in_c) - 1]^{1/2} \quad (2)$$

wherein $\in$ is the strain currently experienced by, and h is the thickness of the overlay 18. Thus, it is appreciated that for rigid substrates 16, i.e., large $E_s$, critical strain is large, amplitude is small, and wrinkles 12 are difficult to form.

It is appreciated that the wrinkle wavelength, $\lambda$, decreases linearly with strain, whereas wrinkle amplitude, A, is independent of strain. Increasing the overlay thickness on the other hand, increases both wrinkle wavelength and amplitude. With respect to the impact of strain, classical wrinkle theory based on elastic energy minimization suggests that wrinkle wavelength should be strain independent according to the following formula:

$$\lambda = 2\pi h \left[ \frac{(1-v_s^2)E_f}{(1-v_f^2)E_s} \right]^{1/3} \quad (3)$$

where E, v, h, and $\in$ represent respectively modulus, Poisson ratio, overlay thickness, and compressive strain, and the subscripts s and f denotes substrate 16 and overlay 18.

Where the wavelength falls within the visible spectrum, it is appreciated that a structural color will result throughout the surface 14. That is to say the wrinkles 12 will cause a color to be perceived by altering the way light travels at different dimensions, as opposed to chemical colors that rely upon the absorption of certain wavelength lights by pigment molecules. It is appreciated that the colors are highly angle dependent; that is to say, the viewing angle contributes to the actual color perceived.

The substrate 16 may be rectangular (FIGS. 2-7), oblong, define a molding, such as an auto trim, or be of any shape, so long as it is large enough to support a surface 14 suitable for displaying the intended wrinkles 12. The substrate 16 may include other components such as an external interface layer (not shown) that facilitates bonding with the overlay 18, or non-active sectors where wrinkles 12 are not desired, for example, to better withstand purely compressive forces.

Moreover, it is appreciated that in each embodiment, the system 10 may be configured such that mechanical deformation effects a modification of the amplitude and wavelength of pre-existing wrinkles 12, so as to vary the surface texture; for example, to reduce veiling glare, it may be sufficient to modulate only in a small range of amplitudes and/or wavelengths to create a meaningful or sufficient change in reflectance, as the modification is (in this particular case) non-linear. Finally, it is appreciated that complex wrinkling patterns may be created by varying the overlay 18 thickness across the substrate 16, or by applying multi-axial (FIGS. 1 and 3), or radial (FIG. 4*a*) loading conditions and similarly modulating.

As shown in FIG. 2, the preferred system 10 further includes a power supply 22 communicatively coupled to the actuator 20, and operable to generate a sufficient activation signal on-demand. In an automotive application, for example, the power supply 22 may include the charging system of the vehicle (not shown). Here, an electronic controller 24 is preferably employed intermediate the supply 22 and actuator 20, and programmably equipped to control actuation. That is to say, the timing, duration, and magnitude of a surface texturing event may be controlled by manipulating the signal accordingly. Lastly, a sensor 26 may be used to provide input (e.g., notice of a triggering event) to the controller 24. In this configuration, the system 10 is operable to provide autonomous texturing, in addition to or lieu of on-demand texturing, when the controller 24 receives the input. For example, a thermometer 26 may be employed to effect active texturing of a steering wheel surface (not shown), when the interior cabin temperature reaches a threshold temperature; or, a photoelectric sensor 26 may be used to actively modify the texture of a dashboard during daylight hours to reduce veiling glare. Similar automation with respect to wind drag and exterior surface texture may also be achieved by the present invention.

In an exemplary embodiment, the substrate 16 consisted essentially of urethane elastomer having a Hardness of Shore 00=40, and the overlay 18 was presented by a mylar film with a thickness of 0.00127 cm. Lateral wrinkles 12 were produced under a uniaxial pre-strain (FIG. 1) and complex wrinkles 12 under biaxial pre-strain (FIG. 2). In another example, the overlay 18 was formed by curing a thin film of urethane adhesive on a uniaxially pre-strained (approximately 10%) surface. The latter embodiment created a constant bed of wrinkles 12 having a wavelength of approximately 250 μm and an amplitude of approximately 100 μm. As previously presented, the substrate 16 may also be coated at room temperature with a "white gold" overlay (e.g., palladium/gold alloy composition) 18 using a sputtering system (not shown). Here, the overlay thickness (e.g., approximately 10 nm) is controlled by deposition time and may be measured directly by a scanning electron microscopic analysis of the cross-sections.

It is appreciated that the substrate 16 may be formed of SMP presenting a normal elastic modulus greater than that of the overlay 18, so as to be able to lock in the pre-strain therein. In this configuration, where actuation (i.e., wrinkle formation) is desired, the SMP substrate is first activated to its higher temperature state, which presents a lower modulus than that of the overlay 18.

To effect wrinkling, the actuator 20 is drivenly coupled to the substrate 16, and more preferably through opposite end caps 28. The end caps 28 preferably coextend with a lateral edge of the substrate 16 (FIGS. 4-6), so that the actuating force is transferred evenly across the substrate 16. The end caps 28 are fixedly secured relative to the substrate 16 and may be anchored therein via over-molded engaging prongs/hooks (not shown) or other fastening methods. In a first embodiment, the actuator 20 includes at least one shape memory wire/tendon formed for example of SMA, EAP, etc. that is embedded within, so as to traverse the full width of the substrate 16 FIGS. 1-5. More preferably, a single wire 20 may be entrained by the end caps 28, so as to form multiple loops along the length of the substrate. The wire 20 is preferably activated so as to promote uniform activation along its length, and thereby cause the caps 28 to travel towards each other without rotation. Where thermally activated, it is appreciated that the substrate 16 must be able to withstand the necessary heating-cooling cycle of the actuator 20.

To effect multi-axial loading and complex wrinkle formation (FIG. 3), it is appreciated that plural wires 20 may traverse the substrate 16 at intercepting orientations. In FIG. 3, a plurality of wires 20 intercept each other in an orthogonal manner, so as to define a mesh or grid. In this configuration, the actuator 20 is configured to effect biaxial loading. Other more complex multi-axial loading configurations may be used, including a wire pattern consisting of radially extending wires 20 that intercept at the center of the substrate 16. In this configuration, the substrate 16 preferably defines a disk; and the resultant wrinkles 12 form concentric rings (FIG. 4*a*).

In another embodiment, the actuator 20 is externally coupled to, and configured to retentively displace at least one cap 28 (FIG. 5). To produce wrinkles 12 or increase the amplitude and reduce the wavelengths of existing wrinkles 12 upon the surface 14, the actuator 20 acts to push the cap 28 towards the midline of the substrate 16. Suitable active material actuators for use in this regard include a piezoelectric stack sandwiched between the end cap 28 and fixed structure that expands when activated to push. An arcuate SMA or EAP element 20 (FIG. 7) that straightens when activated may be used to compress the substrate 16. Finally, an SMP or SMA spring (not shown) able to modify its spring constant when activated may be used wherein only the stiffer constant is able to compress the substrate 16. To reduce the amplitude, and increase the wavelength by pulling at least one end cap 28, a shape memory wire 20 may be employed as previously described, and lengthened/redirected through at least one pulley (also not shown).

In another embodiment, the actuator 20 may consist of an active material sheet (or disk) disposed beneath the substrate 16 (FIG. 6). The planar sheet 20, for example, may be formed of SMA, so as to be caused to contract laterally or radially in all directions when activated. In this configuration, it is appreciated that activating the sheet 20 results in an approximately twenty percent reduction in surface area where maximum recoverable Martensitic strain is provided. In comparison to wire actuators, the sheet 20 applies more evenly distributed loading along the full length and width of the substrate 16. It is also appreciated that the sheet 20 in this case, and the bottom of the substrate 16 (i.e., the face opposite the overlay 18) throughout, must be allowed to float away from the overlay 18 when deformed/constrained on all lateral sides, so as to allow for the resultant increase in substrate height, for incompressible substrate constituencies. The same is true for a substrate 16 consisting of negative Poisson's ratio material.

In yet another embodiment, the system 10 may include a rigid member 30 embedded in the substrate 16 and drivenly coupled to the actuator 20 (FIG. 7). The preferred rigid member 30 is divided into two or more parts 30*a,b* that can be moved in opposite directions to produce a desired wrinkling effect. That is to say, the member 30 may be used to rectify actuation and modulate the wrinkle texture, and acts as a linkage or transmission between the actuator 20 and substrate 16. For example, an active material actuator (e.g., arcuate bi-stable actuator) 20 may be attached to a cross-bar 32 comprising a driven part 30a, and configured to push/pull the part 30a. The rigid member 30 may be inter-digitated as shown in FIG. 7; and the overlapping length, L, of the parts may be prescribed for a desired wrinkling effect. More preferably, the length, L, is adjustable, so as to tune the service life of the member 30 and adjust the amplitude and/or wavelength of the wrinkles 12.

In an alternative embodiment, the substrate 16 may define at least one void (not shown), such that when the embedded rigid member 30 is internally or externally actuated, and the deformation of the substrate 16 propagates to a void location, deformation is relieved at the void location causing a local deformation change in the overlay 18. If the deformation change is sufficiently close to the surfaces to be textured, then the vertical displacement caused by the actuation members is substantially amplified.

Figures 8A, 8B:
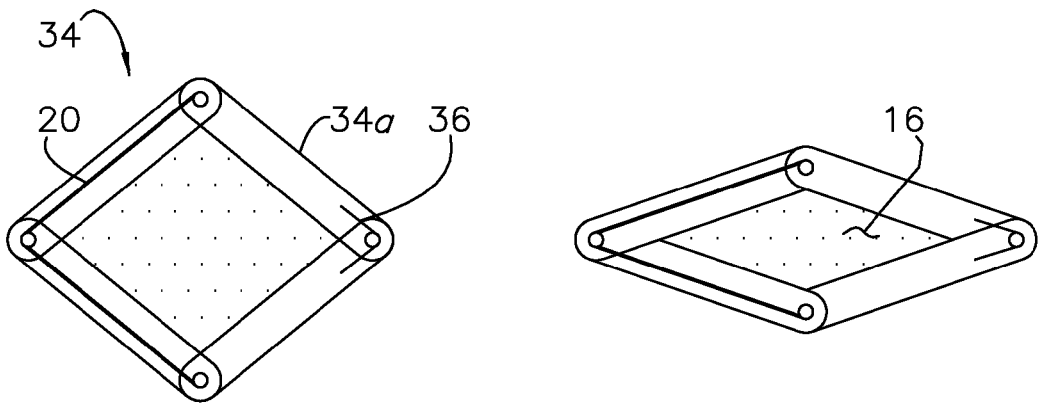
FIG. 8a is a plan view of an actively controlled texturing system including a reconfigurable scissor-jack fixture fixedly coupled to a substrate adhered to an overlay (not shown), and an active material element and return mechanism drivenly coupled to the fixture, in accordance with a preferred embodiment of the invention.
FIG. 8b is a plan view of the system shown in FIG. 8a, wherein the element has been activated, the fixture reconfigured, and the mechanism has been caused to store energy.

Another example of a transmission based system 10 is shown in FIGS. 8a,b, wherein a scissor jack fixture 34 is circumferentially employed about the substrate 16. As shown in the illustrated embodiment, the scissor jack fixture 34 is able to collapse and achieve a more linear, or expand to generate a more obtuse shape. By doing so, the fixture 34 causes the substrate 16 to undergo deformation. To drive collapse and/or expansion, an external actuator 20 and/or return mechanism 36 is drivenly coupled to the fixture 34. The actuator 20, for example, may be a shape memory wire entrained along the length of at least two of the fixture rods 34a. In the illustrated embodiment, where the wire 20 is activated and thereby caused to achieve a shortened length, the fixture 34 is caused to expand (FIG. 8b).

A return mechanism in the form of a spring 36 may be coaxially aligned with at least one vertex defined by the fixture 34, such that when the fixture 34 collapses or expands, the spring 36 is caused to store energy. In the illustrated embodiment, once the actuator 20 is deactivated, the spring modulus of the spring 36 is operable to re-strain the wire 20, and return the fixture to the collapsed condition (FIG. 8a). It is appreciated that the spring 36 may also be formed of an active material (SMP, SMA, etc.), so as to be able to modify its spring constant and the behavior of the system 10 accordingly. For example, a lower spring modulus spring 36 may be used to reduce the actuation force required to expand or collapse the fixture 34, while the greater modulus could be selectively applied only when reversal is desired, and the actuator 20 has fully transformed back to its deactivated state.

In a preferred method of construction, the substrate 16 is mounted within the fixture 34 in the collapsed condition shown in FIG. 8b. In the squared or expanded condition (FIG. 8a) the substrate 16 is fully stretched. The overlay 18 (e.g., stiff coating) is then applied. Driving the fixture 34 into its collapsed condition relaxes the strain in the substrate 16 and consequentially causes the wrinkling phenomenon to occur. Wrinkling may be modulated proportionally with the deformation of the scissor-jack frame.

Figure 9:
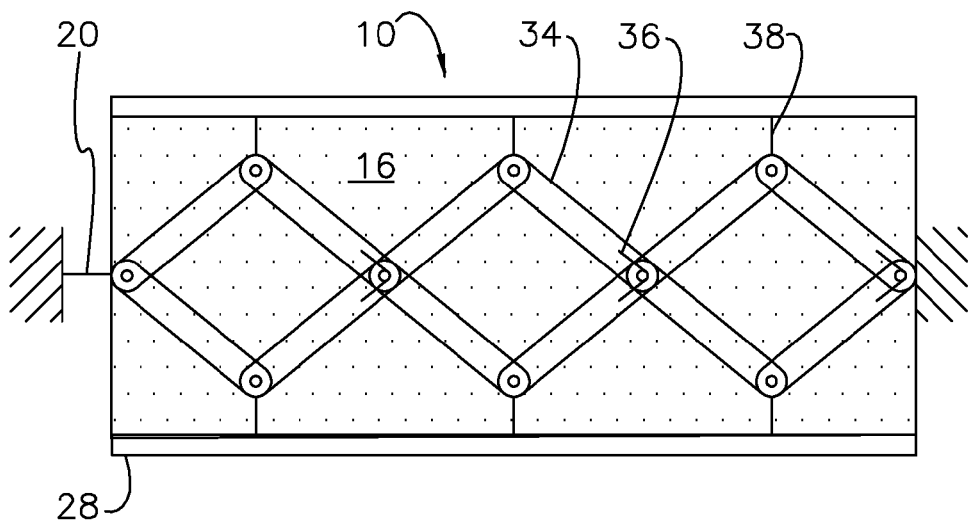
FIG. 9 is a second embodiment of an actively controlled texturing system including a telescoping scissor-jack fixture fixedly coupled to and embedded within a substrate, and an external active material element drivenly coupled to the fixture, in accordance with a preferred embodiment of the invention.

Another scissor-jack configuration is shown in FIG. 9, wherein a telescoping scissor jack fixture 34 is embedded within or disposed beneath the substrate 16, and used to impart longitudinal extension and lateral compression thereupon simultaneously. More preferably, a plurality of struts 38 fixedly attached at the lateral vertices (FIG. 9) may be extended to end caps 28 buttressing the sides of the substrate 16. To drive the fixture 34, a shape memory wire 20 may be drivenly coupled to the distal most vertex defined by the fixture 34. As the fixture 34 extends, the capped sides of the substrate 16 are compressed, thereby producing uni-axial wrinkles 12 in the overlay (FIG. 2). It is appreciated that depending upon the angles defined by the rods 34a, mechanical advantage with respect to force or displacement is provided.

This invention has been described with reference to exemplary embodiments; it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to a particular embodiment disclosed as the best mode contemplated for carrying out this invention, but that the invention will include all embodiments falling within the scope of the appended claims.

What is claimed is:

1. A system for selectively forming wrinkles, or modifying the amplitude, wavelength, and/or pattern of existing wrinkles upon a surface, said system comprising:
    a reconfigurable substrate presenting a first elastic modulus or Poisson's ratio;
    an overlay i) defining the surface, ii) adhered as a layer on the substrate, and iii) presenting a second elastic modulus or Poisson's ratio greater than the first elastic modulus or Poisson's ratio;
    at least one active material actuator operable to undergo a reversible change in fundamental property when exposed to or occluded from an activation signal, the at least one active material actuator drivenly coupled to the substrate;
    said at least one actuator being configured such that the change causes the substrate to reconfigure, and the substrate reconfiguration causes the wrinkles to form or modify upon the surface as a result thereof; and
    opposite end caps fixedly secured to the substrate, wherein the at least one active material actuator is external to the substrate and is configured to push at least one of the opposite end caps toward a midline of the substrate.

2. The system as claimed in claim 1, wherein the substrate is selectively shiftable between the first elastic modulus or Poisson's ratio, and a normal elastic modulus or Poisson's ratio greater than the second elastic modulus or Poisson's ratio.

3. The system as claimed in claim 2, wherein the substrate is formed of shape memory polymer.

4. The system as claimed in claim 1, wherein the actuator includes a shape memory wire.

5. A system for selectively forming wrinkles, or modifying the amplitude, wavelength, and/or pattern of existing wrinkles upon a surface, said system comprising:
    a reconfigurable substrate presenting a first elastic modulus or Poisson's ratio;
    an overlay i) defining the surface, ii) adhered as a layer on the substrate, and iii) presenting a second elastic modulus or Poisson's ratio greater than the first elastic modulus or Poisson's ratio; and
    at least one active material actuator operable to undergo a reversible change in fundamental property when exposed to or occluded from an activation signal, the at least one active material actuator drivenly coupled to the substrate;
    said at least one actuator being configured such that the change causes the substrate to reconfigure, and the substrate reconfiguration causes the wrinkles to form or modify upon the surface as a result thereof;
    wherein the at least one actuator is:

i) a sheet disposed beneath the substrate;
ii) embedded within and traverses the substrate; or
iii) radially extending shape memory wires that intercept at a center of the substrate.

6. The system as claimed in claim 5, wherein the substrate is pre-strained, and the change causes the substrate to undo the pre-strain.

7. The system as claimed in claim 6, wherein the substrate is pre-strained by-axially.

8. The system as claimed in claim 5, wherein, when the actuator is embedded within and traverses the substrate, the actuator forms a mesh that is operable to effect bi-axial loading.

9. The system as claimed in claim 5, wherein said at least one actuator is drivenly coupled to the substrate along multiple axes.

10. The system as claimed in claim 9, wherein a plurality of actuators are individually exposable and/or occluded from the signal, so as to be separately activated and deactivated respectively.

11. A system for selectively forming wrinkles, or modifying the amplitude, wavelength, and/or pattern of existing wrinkles upon a surface, said system comprising:
a reconfigurable substrate presenting a first elastic modulus or Poisson's ratio;
an overlay i) defining the surface, ii) adhered as a layer on the substrate, and iii) presenting a second elastic modulus or Poisson's ratio greater than the first elastic modulus or Poisson's ratio;
a reconfigurable scissor-jack mechanical actuator drivenly coupled to and embedded within the substrate, the mechanical actuator including a plurality of lateral vertices, each of the plurality of lateral vertices having an end of a strut fixedly attached thereto;
a shape memory wire drivenly coupled to a distal longitudinal vertex of the mechanical actuator;
said shape memory wire and mechanical actuator being operable to reconfigure the substrate, and the substrate reconfiguration causing the wrinkles to form or modify upon the surface as a result thereof; and
first and second opposite longitudinal end caps fixedly secured to opposed longitudinal sides of the substrate;
wherein each of the struts, at a strut end distal to the lateral vertex attachment strut end, is attached to an adjacent one of the first or second longitudinal end caps.

12. The system as claimed in claim 11, wherein the substrate is formed of a urethane elastomer, and the overlay is formed of MYLAR film and has a thickness of approximately 0.00127 centimeters.

13. The system as claimed in claim 11, wherein the substrate is formed of a urethane elastomer, and the overlay is formed of a urethane adhesive.

14. The system as claimed in claim 11, wherein the actuator presents multiple stroke lengths, and is operable to variably reconfigure the substrate and variably cause the wrinkles to form or modify upon the surface.

15. The system as claimed in claim 1, wherein said at least one actuator is further configured such that the change causes the substrate to reconfigure and the substrate reconfiguration causes the existing wrinkles to smooth out.

16. The system as claimed in claim 1, wherein the substrate is formed of a urethane elastomer, and the overlay is formed of MYLAR film or a urethane adhesive.

* * * * *